United States Patent [19]
Soto et al.

[11] Patent Number: 5,914,816
[45] Date of Patent: Jun. 22, 1999

[54] HELMET MOUNT FOR NIGHT VISION GOGGLE

[75] Inventors: Ronald R. Soto, Laguna Hills; Jonathan R. Prendergast, Newport Beach; Bret F. Hawman, La Mirada; Brian K. Crawford, Costa Mesa, all of Calif.

[73] Assignee: Norotos, Inc., Santa Ana, Calif.

[21] Appl. No.: 08/964,051

[22] Filed: Nov. 4, 1997

[51] Int. Cl.⁶ .............................. G02B 27/14; G02B 7/02; A42B 3/22
[52] U.S. Cl. ................................. 359/630; 359/822; 2/6.5
[58] Field of Search ..................... 359/409, 410, 359/630, 632, 815; 345/8; 2/6.2, 6.3, 6.5, 6.8, 422, 424

[56] References Cited

U.S. PATENT DOCUMENTS

| | | | |
|---|---|---|---|
| 4,449,787 | 5/1984 | Burbo et al. | 350/538 |
| 4,689,834 | 9/1987 | McCarthy et al. | 2/422 |
| 5,176,342 | 1/1993 | Schmidt et al. | 244/122 |
| 5,226,181 | 7/1993 | Polednak et al. | 2/422 |
| 5,331,684 | 7/1994 | Baril et al. | 2/6.2 |
| 5,347,119 | 9/1994 | Connors | 250/214 VT |
| 5,408,086 | 4/1995 | Morris et al. | 250/214 VT |
| 5,467,479 | 11/1995 | Mattes | 2/6.3 |
| 5,469,578 | 11/1995 | Mattes | 2/6.7 |
| 5,471,678 | 12/1995 | Dor | 2/6.7 |
| 5,506,730 | 4/1996 | Morley et al. | 359/815 |
| 5,542,627 | 8/1996 | Crenshaw et al. | 244/121 |
| 5,648,862 | 7/1997 | Owen | 359/153 |
| 5,703,354 | 12/1997 | Wannagot et al. | 250/215 VT |

*Primary Examiner*—Georgia Epps
*Assistant Examiner*—Ricky Mack
*Attorney, Agent, or Firm*—Christie, Parker & Hale, LLP

[57] ABSTRACT

A flip-up helmet mount for a night vision device is disclosed. The flip-up helmet mount includes a position adjustment assembly for adjusting the position of the night vision device between a use and a stowed position, a tilt adjustment assembly for adjusting the tilt angle of the night vision device relative to a user's eyes, and a focal adjustment assembly for adjusting the focus or location of the night vision device relative to the user's eyes. The assemblies provided for position, tilt, and focus adjustment all permit one-handed adjustment of these features of the flip-up helmet mount. Additionally, the flip-up helmet mount includes an improved automatic shutdown assembly that provides reliable shutdown of the night vision device when not in the use position.

25 Claims, 5 Drawing Sheets

Fig. 4

HELMET MOUNT FOR NIGHT VISION GOGGLE

FIELD OF THE INVENTION

This invention relates generally to mounting assemblies for night vision devices, and more particularly to a flip-up helmet mount for a night vision goggle that includes position adjustment, tilt adjustment, focal adjustment, and automatic shutdown assemblies, wherein the position, tilt, and focal adjustment are designed to allow for one-hand operation by the user of the night vision device.

BACKGROUND OF THE INVENTION

Night vision devices are commonly used by military personnel for conducting operations in low light or night conditions. The night vision devices utilized by the military typically include image intensifier tubes and associated optics that convert infrared and near infrared light into viewable images. A common night vision device currently being used in the U.S. Army is the PVS7 night vision goggle, manufactured by ITT Corporation in Roanoke, Va.

Assemblies for mounting night vision devices to a helmet are well known in the art. These mounting assemblies allow a user's hands to remain free while viewing a scene through the night vision device. Prior art mounting assemblies typically include one or more of the following features: positional adjustment of the night vision device between a use and stowed position; tilt angle adjustment of the night vision device relative to the user's eyes; focal adjustment of the location of the night vision device relative to the user's eyes; and automatic shutdown of the night vision device when not in the use position.

An example of a prior art mounting assembly for night vision devices can be seen in U.S. Pat. No. 5,506,730 to Morely et al. (hereinafter "Morely"). Morely discloses a flip-up helmet mount for a night vision goggle that attempts to provide all of the features identified above. However, the device disclosed by Morely is believed to be deficient in its operational aspects because, among other reasons, the flip-up helmet mount is not designed for one-handed operation. More particularly, the tilt adjustment means disclosed by Morely requires a user to loosen a locking knob with one hand, while at the same time repositioning the night vision device with the other hand. Obviously, given the conditions under which night vision devices are typically used, it is undesirable and potentially unsafe for adjustment of the night vision device to occupy both hands of the operator. If both hands of the operator are required to adjust the night vision device, then the operator will be unable to continue carrying a weapon or other equipment in one of his hands. It can certainly be appreciated that having to put down one's weapon in order to adjust the night vision device may expose the operator of the device to certain unnecessary risks.

The flip-up helmet mount disclosed in Morely is also believed to be deficient in its operational aspects because of the automatic shutdown assembly's susceptibility to jamming. The automatic shutdown assembly disclosed in Morely includes a magnet housing having an S-shape or question-mark shape. Commercial embodiments of the Morely helmet mount include a long (e.g. 1 inch in length), narrow (e.g. ⅛ inch in diameter) cylindrical bar magnet movably received within the S-shaped cavity. This combination of an S-shaped cavity and a relatively long, narrow bar magnet results in an automatic shutdown assembly with questionable reliability. Specifically, the long, narrow bar magnet can easily become askew within the S-shaped cavity as the magnet moves within the cavity. When the magnet becomes askew within the cavity, the automatic shutdown assembly becomes jammed and the night vision device does not automatically turn off when rotated into the stowed position. This is obviously undesirable since the phosphor yellow/green light emitted from the night vision device would then be visible to possibly hostile personnel in front of the operator.

There are additional aspects of the flip-up helmet mount disclosed in Morely that are believed to be inadequate given the conditions in which these devices are typically used. For example, Morely discloses a rib that is receivable into one of two grooves to retain the night vision device in either the use or stowed position. However, a significant amount of noise is produced by this rib and groove combination when the rib engages the groove. Obviously, excessive noise can draw unwanted attention to the operator of the night vision device.

Additionally, the focal adjustment assembly disclosed in Morely requires the operator of the night vision device to apply force inwardly to a pair of release buttons in order to adjust the location of the night vision device relative to his eyes. It is believed that this requires a rather awkward movement of the hand or hands of the operator that makes focal adjustment relatively difficult.

These and other problems exist with the flip-up helmet mounts for night vision devices disclosed in the prior art. Consequently, a need exists for an improved flip-up helmet mount.

SUMMARY OF THE INVENTION

The present invention, therefore, provides an improved flip-up helmet mount for night vision devices. More particularly, the flip-up helmet mount according to the present invention is designed to allow for one-handed adjustment of the position, tilt, and focus of the night vision device.

The flip-up helmet mount includes a helmet block for securing the night vision device to a helmet, and a chassis for receiving the night vision device. The chassis is rotationally coupled to the helmet block by a bracket member extending between the helmet block and the chassis. A position adjustment assembly is provided within the helmet block for adjusting the night vision device between a use position, in front of the user's eyes, and a stowed position, out of the line-of-sight of the user. A tilt adjustment assembly is provided for adjusting the tilt angle of the chassis relative to the bracket member, and thus the night vision device relative to the user's eyes. Additionally, a focal adjustment assembly is provided for adjusting the location of the night vision device relative to the chassis. The flip-up helmet device also includes an automatic shutdown assembly for automatically shutting down the night vision device when it is not in the use position.

In a presently preferred embodiment, the position adjustment assembly includes a spring-biased ball and detent system, wherein a plurality of balls are biased by springs toward a shaft, rotationally received in a transverse bore in the helmet block, that includes a pair of transverse detents extending along the length of the shaft, corresponding to the use and stowed position of the night vision device. The spring-biased ball and detent system provides for extremely quiet operation of the flip-up helmet mount.

Also, in a presently preferred embodiment, the tilt adjustment assembly includes a cam system, wherein rotation of a cam knob produces rotation of the chassis relative to the bracket member. The cam based tilt adjustment assembly provides for one-handed adjustment of the tilt angle of the night vision device. Moreover, the cam based assembly permits substantially infinite adjustment of the tilt angle within a predetermined range.

Additionally, in a presently preferred embodiment, the focal adjustment assembly includes a hinged release lever that is biased by a return spring to engage one of a plurality of notches on one of a pair of racks of the chassis. The night vision device is slidably received on the racks of the chassis. Application of a downward force on the release lever disengages the release lever from the notch and permits adjustment of the location of the night vision device relative to the chassis. The single release-lever provides for one-handed adjustment of the location of the night vision device and is believed to be ergonomically superior to prior art systems.

Still further, in a presently preferred embodiment, the automatic shutdown assembly includes a magnet module having a vertically extending cavity with a substantially oval-shaped profile. A cylindrical bar magnet is slidably received within the cavity to move in response to movement of the night vision device between the use and stowed position. The automatic shutdown assembly operates to automatically shutdown the night vision device whenever it is not in the use position. The shape of the cavity and the dimensions of the bar magnet combine to produce a reliable automatic shutdown assembly that is essentially jam proof.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION

Figure 1:
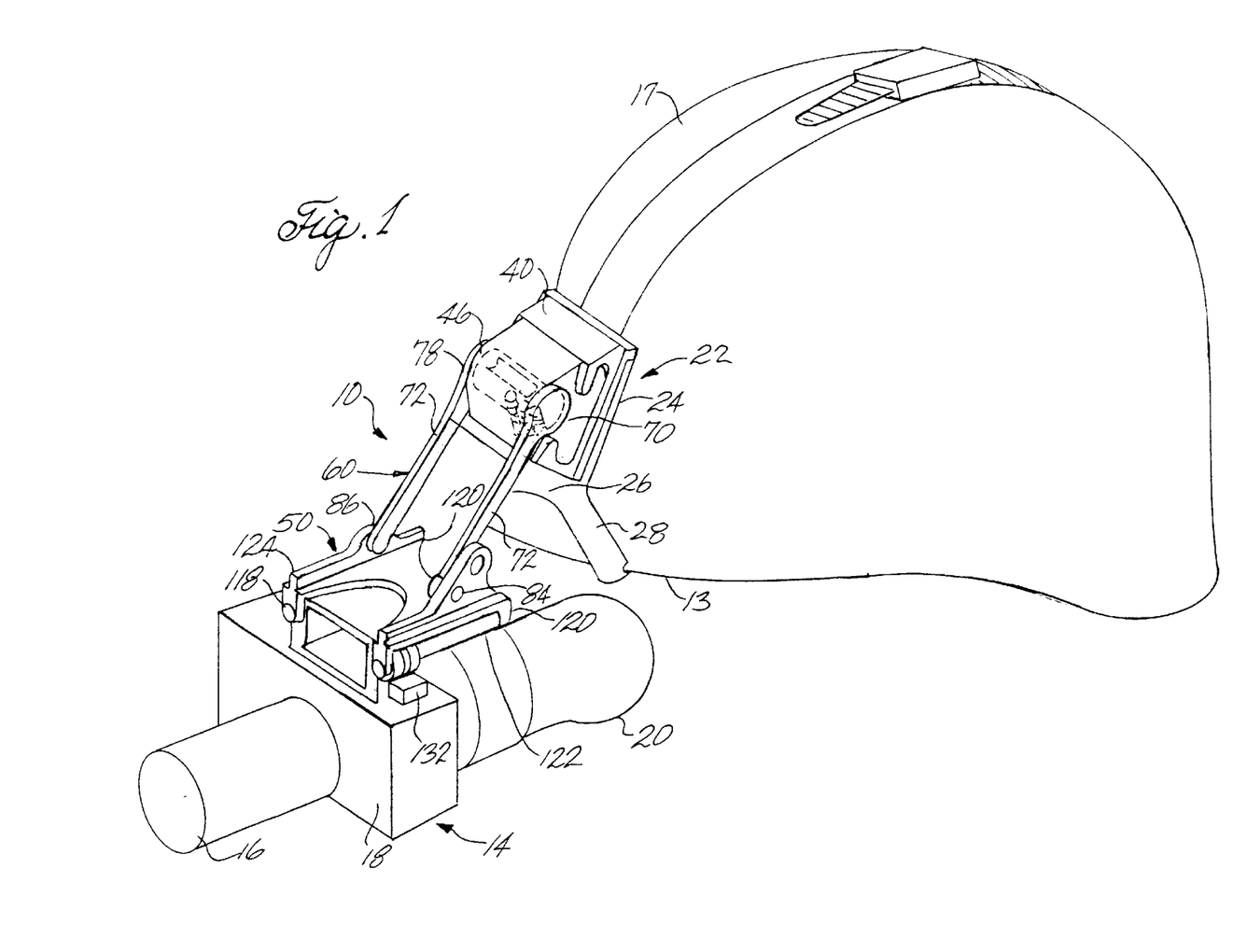
FIG. 1 is a perspective view of the flip-up helmet mount provided for in the present invention secured to a helmet, wherein the night vision device is in a use position.

Referring now to FIG. 1, a presently preferred embodiment of a flip-up helmet mount 10 according to the present invention is shown. The flip-up helmet mount 10 is shown in use with a standard U.S. Army Kevlar composite helmet 12. A night vision device 14 is secured to the helmet 12 by use of the flip-up helmet mount 10. The night vision device 14 shown in FIG. 1 is a night vision goggle that includes a single objective lens 16, a housing 18, and a pair of eye pieces 20. To use the night vision goggle 14, the operator places it in the position depicted in FIG. 1 and looks into the eye pieces 20 to see an enhanced image representative of the low-level light from a night scene which has entered the objective lens.

The flip-up helmet mount 10 may be secured to the helmet in any of the ways well known in the art. FIG. 1 shows the flip-up helmet mount secured to the helmet by means of a quick release mechanism assembly 22. The quick release mechanism assembly includes a brace plate 24 having a broad based hook member 26. The hook member 26 includes a pair of laterally spaced apart hook portions 28, which engage under a brim 13 of the helmet. The quick release mechanism may be secured to the helmet by a strap 30 that includes ratchet means for adjusting the strap relative to the helmet to ensure a sung fit on various sizes of helmets. Alternatively, fasteners may be used to secure the quick release mechanism assembly directly to the helmet.

The flip-up helmet mount 10 includes a helmet block 40, which is releasably secured to the quick release mechanism assembly. A rear surface 42 of the helmet block engages the brace plate 24 of the quick release mechanism assembly when the flip-up helmet mount is secured to the helmet. As can be in FIG. 1, a front surface 44 of the helmet block 44 defines a transverse boss 46, having a transverse bore 48 therein. As will be described in more detail below, the night vision device is rotationally coupled with the helmet block to allow the user to pivot the night vision device between a use and a stowed position.

The flip-up helmet mount 10 also includes a chassis 50 for receiving the night vision device 10. The night vision device 10 is coupled with the chassis by a socket assembly 52. The socket assembly 52 is slidably received on the chassis 50 to allow focal adjustment of the night vision device. Additionally, the chassis is coupled with the helmet block by an upright, or bracket member 60. The chassis is rotationally coupled with the bracket member at a proximal end of the bracket member to allow for tilt angle adjustment of the night vision device.

Position Adjustment

Figures 3, 5:
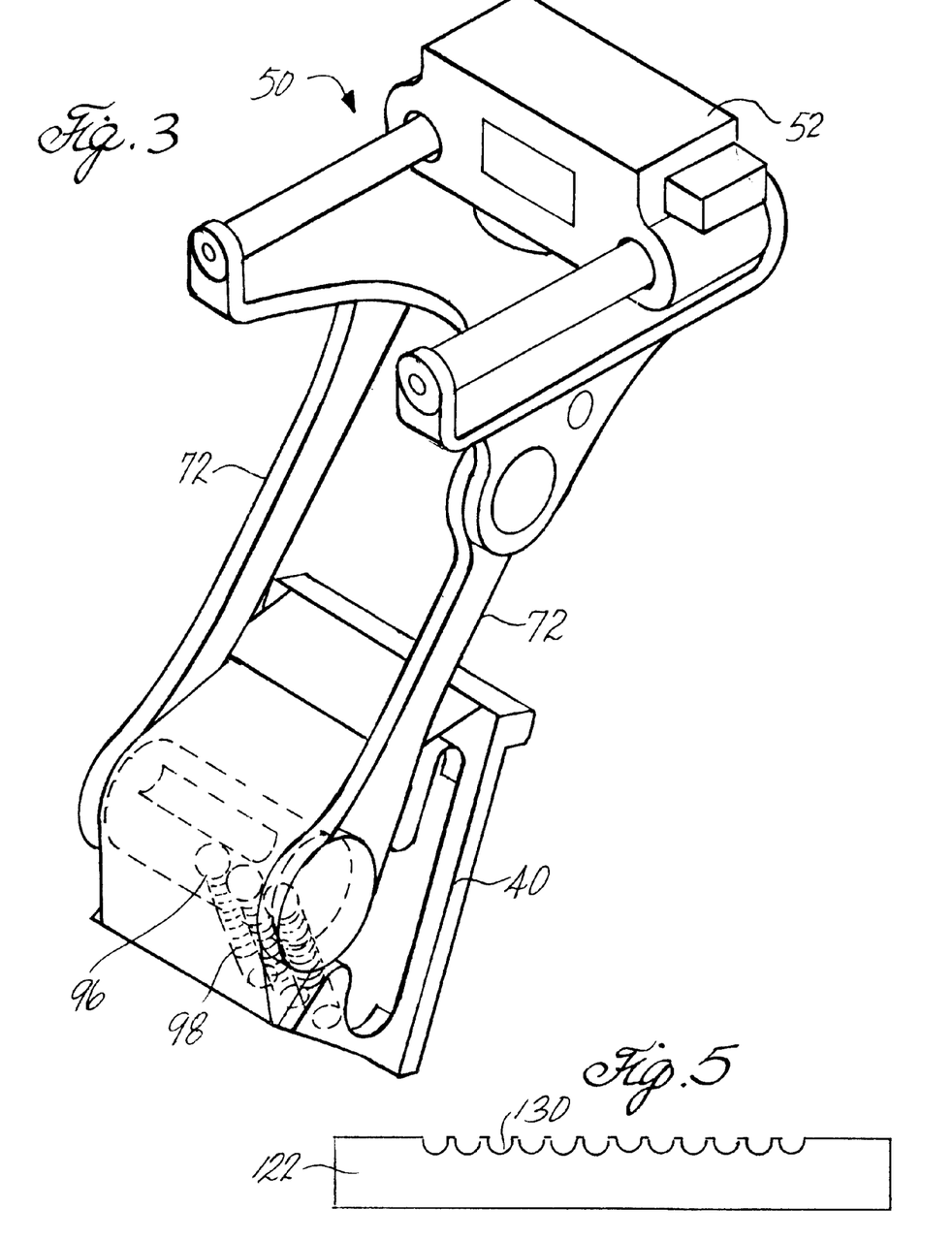
FIG. 3 is a perspective view of the flip-up helmet mount of FIG. 1 in a stowed position.
FIG. 5 is a side elevation view of one of the racks of the chassis of the flip-up helmet mount of FIG. 2.

The flip-up helmet mount enables an operator to adjust the night vision device between an use position, shown in FIG. 1, and a non-use or stowed position, shown in FIG. 3. In FIG. 1, the night vision device is positioned in front of the operator's eyes so that the operator may look through the eye pieces 20 of the night vision goggle. However, the flip-up helmet mount also allows the operator to flip the night vision goggle into a stowed position, completely above the line of sight of the operator, to permit normal, unobstructed vision.

In order to enable the operator to adjust the position of the night vision goggle 14, the goggle is rotationally coupled with the helmet block 44. A cylindrical shaft 70 is rotationally received within the transverse bore 48 of the helmet block. Coupled with and carried by the shaft 70 is the bracket member 60. The bracket member 60 includes a pair of spaced apart flange portions 72, which are coupled together by a transverse web portion 74. Proximal ends of the flange portions 76, 78 of the bracket member are coupled with respective ends of the cylindrical shaft 80, 82. Additionally, distal ends of the flange portions 84, 86 of the bracket member are coupled with respective side of the chassis 88, 90. The chassis 50 is coupled with the bracket member 60 to allow some rotation of the chassis relative to the bracket member. The coupling of the shaft 70 to the bracket member 60, the bracket member 60 to the chassis 50, and the night vision goggle 14 to the chassis 50 results in the night vision goggle 14 being rotationally coupled with the helmet block 44.

Additionally, in order to provide retention of the night vision goggle in either of its operation or stowed position, the flip-up helmet mount 10 includes a spring-biased ball and detent system 92 within the helmet block 44. A plurality of bores 94 are provided within the helmet block for receiving a plurality of spring-biased ball plungers 96. A spring 98 extends through each of the plurality of bores 94. One end 97 of each spring is pinned or fixed, and the other end 99 of each spring bears against a smooth ball plunger 96. The bores are located within the helmet block so that the spring pressure biases the ball plungers against the cylindrical shaft 70. Additionally, the bores are located within the helmet block so that the ball plungers are aligned parallel to the axis of rotation 71 of the shaft.

A pair of transverse detents 100, 102 extend along the length of the shaft 70. The detents receive the spring-biased ball plungers 96 to releasably retain the night vision goggle 14 in either the use or stowed position. The detents 100, 102 are angularly located on the shaft 70 to correspond, respectively, to the use and stowed position of the night vision goggle 14. Generally speaking, the detents are located about 180 degrees apart on the shaft. More particularly, the shaft 70 is located within the transverse bore 48 of the helmet block 44 such that when the night vision goggle 14 is in the use position, the ball plungers 96 are biased by spring pressure into the use detent 100. Conversely, when the night vision goggle 14 is in the stowed position, the ball plungers 96 are biased by spring pressure into the stowed detent 102. As the user adjusts the night vision goggle from the use to the stowed position, the spring-biased ball plungers are released from the use detent, and eventually engage the stowed detent, once the goggle has been rotated out of the user's line of sight and into the stowed position.

Preferably, the spring pressure is such that the friction between the balls and the shaft is sufficient to retain the night vision goggle in a selected position even if the night vision goggle has not been fully rotated into the use or stowed position. In other words, the spring pressure should be sufficient to prevent a pivotal free fall of the night vision goggle should the user not detent the system in its stowed position.

It should be obvious to one skilled in the art that the force required to adjust the night vision goggle from the use to the stowed position will depend on a number of factors, including, the number of spring-biased plungers, the size of the spring-biased plungers, the strength of the springs, the depth of the detents, etc. In a presently preferred embodiment, these and other variables have been selected to satisfy the current specifications of the United States Army with respect to helmet mount assemblies, and in particular, the requirements of QAP No. A3260927. In order to satisfy these requirements, in a presently preferred embodiment, three spring-biased $3/16$th inch smooth ball plungers are adapted to engage an use detent having a depth of about 0.05 inches, and a stowed detent, having a depth of about 0.075 inches. Obviously, however, the specifics of any of these variables may vary with the requirements of the application for which the flip-up mount is being used.

One of the important advantages of the spring-biased ball and detent assembly 92 is that it provides for extremely quiet operation of the flip-up helmet mount as the night vision goggle is adjusted between the use and stowed position. Additionally, the spring-biased ball and detent assembly allows for simple, one-handed adjustment of the night vision device between the use and stowed position.

Preferably, the helmet block and the spring-biased ball and detent system are designed to optimize the durability of the flip-up helmet mount. In particular, in a presently preferred embodiment, the helmet block is designed without any stops on the body of the helmet block corresponding to the stowed position. Prior art flip-up helmet mounts typically include at least one stop on a side of the helmet block to prevent the flip-up helmet mount from over rotating when stowed. The flip-up mount may over rotate if an excessive amount of force is applied to the mount, for example, when the flip-up mount is attached to the helmet and the helmet is dropped on the flip-up mount. In attempting to prevent over rotation of the flip-up mounts, the stops often exert an excessive force on a small section of the flip-up mount that may result in failure of the structure. Therefore, it is believed that removing the stops corresponding to the stowed position of the helmet will increase the durability of the flip-up mount. In particular, removing the stops will cause the night vision device to first contact the helmet if the flip-up mount over rotates. Additionally, the spring-biased ball and detent system will act as a buffer to absorb some of the energy and momentum of the night vision device as it begins to over rotate.

Tilt Adjustment

In addition to allowing for adjustment of the position of the night vision device, the flip-up helmet mount 10 also allows for adjustment of the tilt of the night vision device relative to the user's eyes. In a presently preferred embodiment, a cam system 104 is provided to permit tilt angle adjustment of the chassis 50. The cam system 104 includes a cam knob 106 located adjacent the distal end one of the flanges of bracket member 60. Rotation of the cam knob 106 causes rotation of a cam 108 and of a shaft 110. The shaft 110 rotationally couples the chassis 50 to the bracket member 60. Therefore, rotation of the cam knob 106 results in rotation of the chassis 50, and thus tilting of the goggle 14 relative to the user's eyes. In a presently preferred embodiment, the cam system includes a friction washer 51 on the back side of the cam, which produces enough friction such that the chassis will not slip under normal operating conditions.

One of the important advantages of the cam operated tilt adjustment assembly 104 is that it allows for simple, one-handed tilt angle adjustment of the night vision device. As can be appreciated from FIG. 2, tilt adjustment can be accomplished by using only one hand to turn the cam knob 106. The design of the cam operated tilt adjustment assembly allows for real-time adjustment of the tilt angle of the night vision device. Moreover, the cam operated tilt adjustment assembly allows for substantially infinite adjustment of the tilt angle within a predetermined range, rather than limiting the tilt angle adjustment to one of a plurality of predetermined levels.

Focal Adjustment

The flip-up helmet also allows for focal adjustment of the location of the night vision device relative to the user's eyes. As described above, the night vision device 14 is coupled with the chassis 50 by the socket assembly 52. The chassis includes a pair of side members 112, 114, connected by a central member 116. Each side member has a front depending segment 118 and a rear depending segment 120. A pair of racks 122, 124 extend between the front and rear depending segments. The socket assembly 52 is slidably received on the racks 122, 124 by way of a pair of holes 126, 128 within the socket assembly. As a result, when the night vision device is in the use position, the location of the socket assembly 52 may be adjusted relative to the chassis 50, resulting in adjustment of the location of the night vision device 14 relative to the user's eyes.

Figure 4:
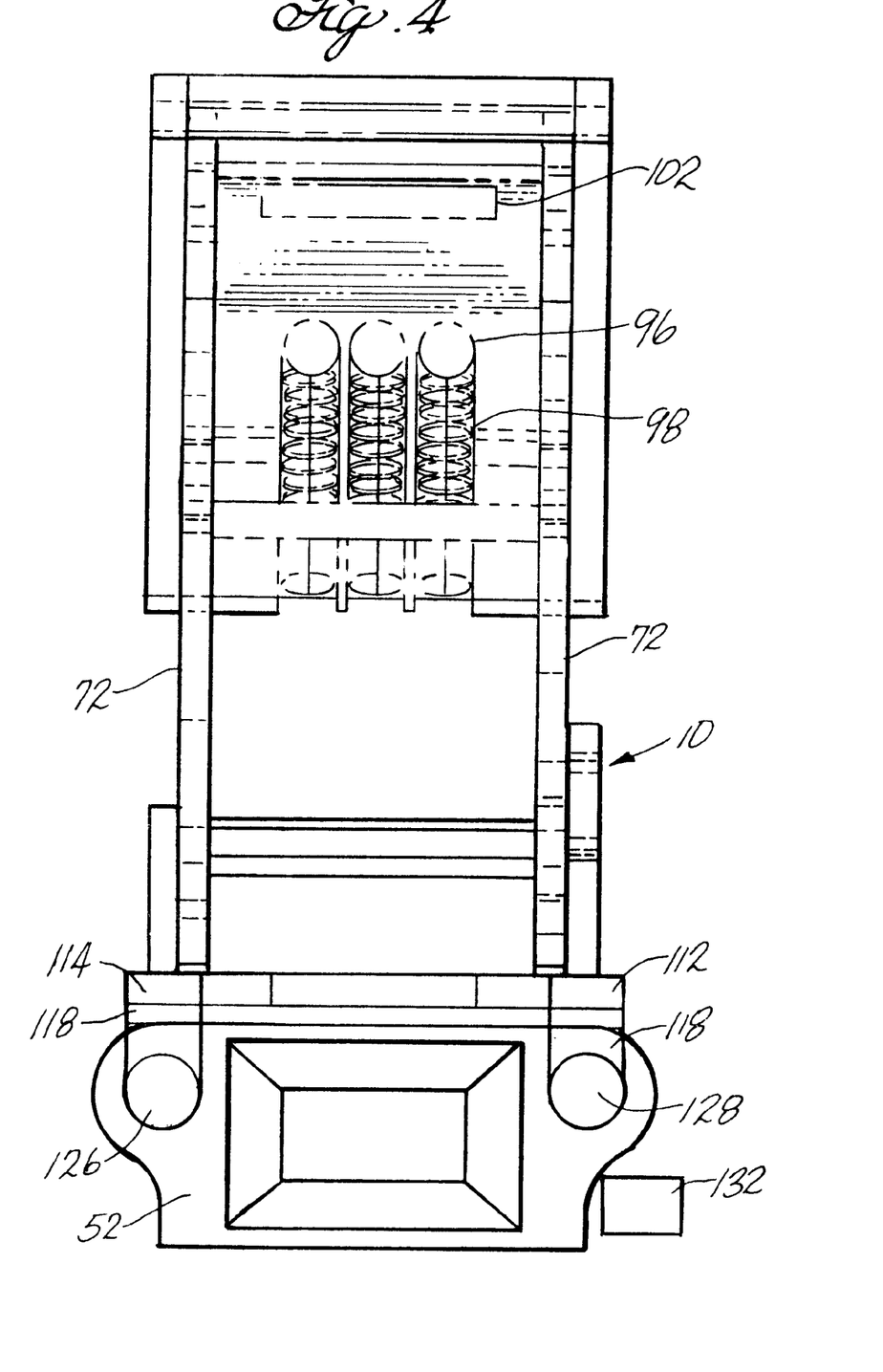
FIG. 4 is a front elevation view of the flip-up helmet mount of FIG. 2.

In order to provide for retention of the night vision device 14 once focal adjustment is complete, a plurality of notches 130 are provided on one of the racks 122 for engagement of a release lever 132. As can be seen from FIG. 4, the release lever 132 is biased under spring pressure to engage one of the notches 128 in the rack 122, essentially locking the night vision device 14 in a selected position relative to the user's eyes. In order to adjust the position of the night vision device relative to the user's eyes, it is simply necessary to apply a downward force to the release lever 132. The downward force causes the release lever to pivot around pin 134, disengaging the lever from notch 130. Once the release lever has been disengaged from the notch, the position of the night vision device 14 may be adjusted by moving the socket assembly 52 forward or backward along the racks 122, 124 of the chassis 50. When the night vision device has been positioned as desired, the user may release the lever 132, which will be biased into one of the notches 130 by return spring 136.

Again, one of the important advantages of the focal adjustment assembly provided for in the flip-up helmet mount is that it allows for simple, one-handed focal adjustment of the night vision device. As can be appreciated from FIG. 4, focal adjustment can be accomplished by using only one hand to push downward on the release lever 132. Moreover, the use of a single release lever requiring the application of a downward force to permit focal adjustment is believed to be ergonomically superior to the designs disclosed in the prior art.

Automatic Shut Down Assembly

Additionally, the flip-up helmet mount 10 provides for automatic shutdown of the night vision device 14 when in the stowed position. More particularly, the flip-up helmet mount provides for reliable, and essentially jam proof, automatic shutdown of the night vision device.

As is well known in the art, the night vision goggle 14 includes a power supply in the form of a battery pack (not shown) internal to the housing 18. A power supply circuit provides power to an image intensifier tube (not shown), which supplies to the eye pieces 20 an intensified image in phosphor yellow/green light of the scene viewed by the objective lens 16. The power supply circuit also includes a magnetically-responsive switch, schematically indicated as 138 in FIG. 2. The switch 138 maintains electrical power supply to the goggle 14 once it is turned on by the user only so long as a magnetic field of sufficient strength is supplied to the switch 138. An automatic shutdown assembly is practically essential when using a flip-up helmet mount, since, as best seen in FIG. 3, should the user forget to turn off the night vision goggle before moving it to the stowed position, the phosphor yellow/green light emitted from the eye pieces 20 would be visible to possibly hostile personnel in front of the user. The phosphor yellow/green light would appear as a pair of small spot lights and may be visible at great distances at night, indicating the position of the user of the night vision goggle to those in front of the user.

Figures 2, 7, 8:
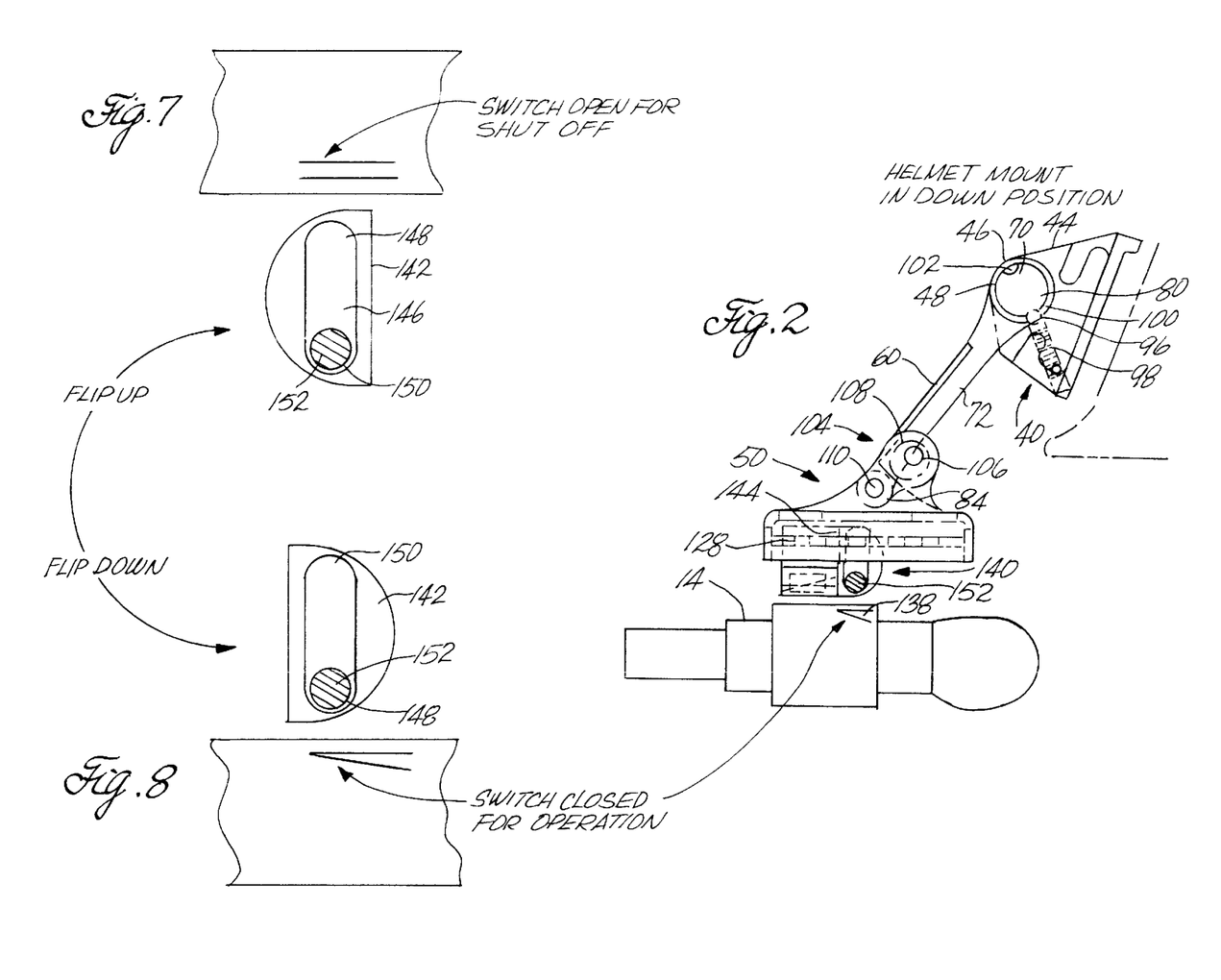
FIG. 2 is a side elevation view of the flip-up helmet of FIG. 1, removed from the helmet.
FIG. 7 is a partial cross-sectional view of the automatic shutdown assembly, with the night vision device in the use position.
FIG. 8 is a partial cross-sectional view of the automatic shutdown assembly, with the night vision device in the stowed position.
Figure 6:
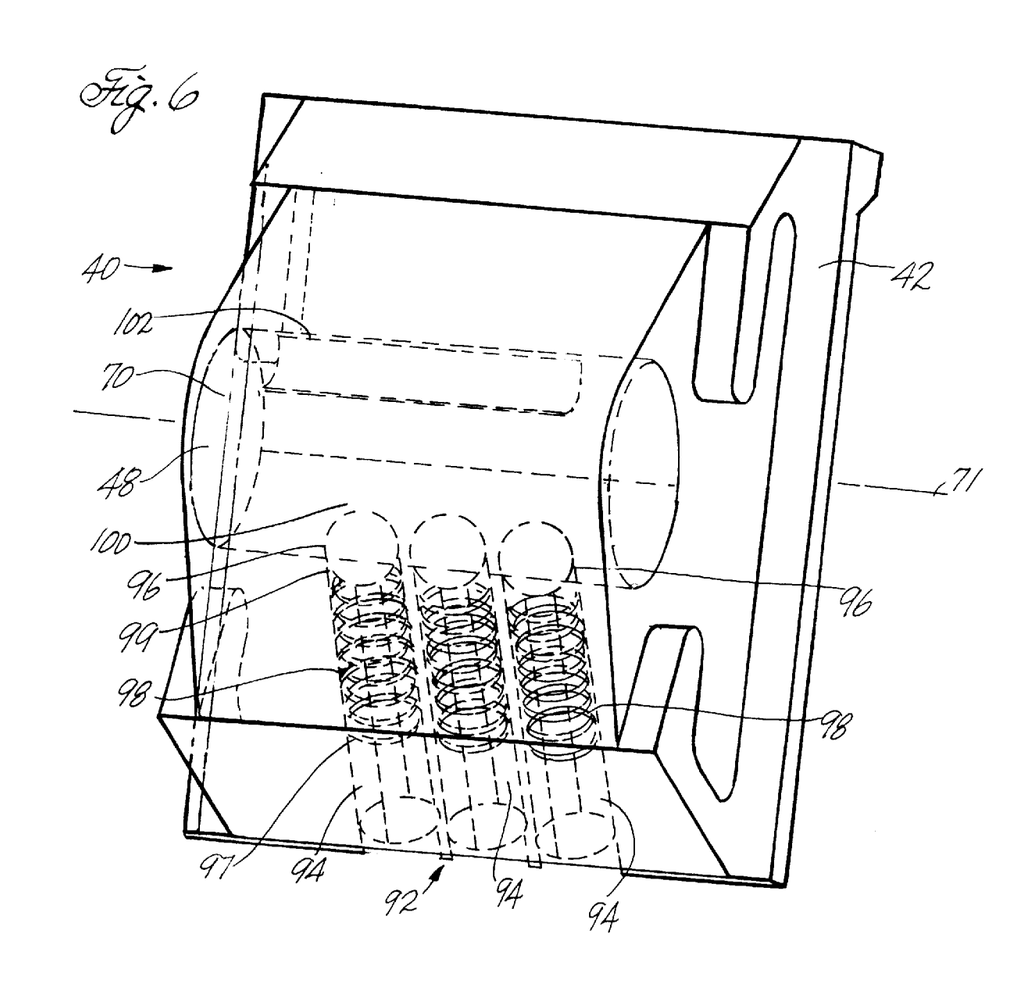
FIG. 6 is a perspective view of the helmet block.

Accordingly, the flip-up helmet mount 10 includes an automatic shutdown assembly 140 to provide the necessary magnetic flux to the switch 138 when the night vision device is in the use position, while at the same time insuring that the magnetic field is removed from the switch 138 when the night vision goggle is pivoted to the stowed position. The automatic shutdown assembly includes a magnet module 142 depending from the socket assembly 52. The magnet module 142 is located at a rear section 144 of the socket assembly, immediately above the magnetically responsive switch 138 of the night vision goggle. The module 142 has a vertically extending cavity 146, having a substantially oval-shaped profile, as can be seen in FIGS. 6 and 7. The cavity 146 includes two ends, a use end 148, adjacent to the switch 138, and a stowed end 150, opposite the switch 138.

Slidably received within the cavity 146 is a cylindrical bar magnet member 152. The bar magnet 152 provides sufficient magnetic flux to the switch 138 to keep the night vision goggle 14 turned on so long as the magnet 152 is in, or immediately adjacent to, the use end 148 of the cavity 146. As can be seen from FIG. 6, the magnet 152 is in this position when the night vision goggle 14 is in the use position. By way of contrast, however, when the user flips-up the night vision goggle 14 into the stowed position, gravity acts on the bar magnet 152 to move the magnet away from the use end 148 of the cavity, to the stowed end 150 of the cavity 146. The bar magnet 152 is sufficiently far enough from the magnetically responsive switch 138 when it is in the stowed end 148 of the cavity that the night vision goggle 14 is automatically turned off.

One of the important advantages of the automatic shutdown assembly 140 provided for in the flip-up helmet mount is that it is more reliable that the assemblies provided for in the prior art. This reliability of the shutdown assembly is due in part to the substantially straight cavity and the dimensions of the bar magnet, specifically the length to diameter ratio of the magnet. In a presently preferred embodiment, the magnet is a ¼ inch long, ¼ inch diameter cylindrical bar. Preferably, the length to diameter ratio of the bar magnet is about 1:4 to about 2:1.

In use of the flip-up helmet mount, the operator first secures the quick release mechanism assembly to the helmet and then secures the flip-up mount to the quick release mechanism assembly. Once the flip-up mount is secured to the helmet, the night vision goggle may be secured to the socket assembly and adjusted into its use position seen in FIG. 1. As so positioned, the bar magnet member is positioned to maintain the night vision goggle turned on once the operator switches it on. In this position, the operator is able to adjust the tilt and focus of the goggle using a single hand, allowing to operator to optimize the viewing conditions of the goggle without occupying both of his hands during the adjustment process. When the operator flips the goggle up to its stowed position, the goggle is automatically turned off, as explained above.

It should be noted that in a presently preferred embodiment, a number of the components of the flip-up helmet mount are made from aluminum. Prior art helmet mounts were generally made from plastic. The novel design of the flip-up helmet mount provided for in the present invention, permits the use of aluminum for a number of components, providing added strength and stability to the structure, while not increasing the overall weight of the flip-up helmet mount when compared to the plastic versions disclosed in the prior art. Specifically, in the presently preferred embodiment where only the helmet block and the magnet module remain plastic, the flip-up helmet mount is approximately 10% lighter than most of the prior art plastic flip-up mounts.

While various embodiments of this invention have been shown and described, it would be apparent to those skilled in the art that many more modifications are possible without departing from the inventive concept herein. For example, although the tilt and focal adjustment assemblies have been illustrated on one side of the flip-up helmet mount, it should be realized that the assemblies could easily be located on either side of the flip-up helmet mount. In other words, the flip-up helmet mount could be designed for one-handed operation by either the right or left hand of the user. It is, therefore, to be understood that within the scope of the appended claims, this invention may be practiced otherwise than as specifically described.

What is claimed is:

1. A flip-up helmet mount for a night vision device, the flip-up helmet mount comprising:
    a helmet block adapted to secure the flip-up helmet mount to a helmet;
    a chassis adapted to receive the night vision device;
    a bracket member, extending between the helmet block and the chassis adapted to rotationally couple the chassis to the helmet block;
    a one-handed position adjustment assembly within the helmet block for adjusting the night vision device between a use position and a stowed position;
    a one-handed tilt angle adjustment assembly for adjusting a tilt angle of the chassis relative to the bracket member; and
    a one-handed focal adjustment assembly for adjusting a location of the night vision device relative to the chassis.

2. The flip-up helmet mount according to claim 1 further comprising an automatic shutdown assembly adapted to influence a magnetically-responsive switching device on the night vision device, the magnetically-responsive switching device maintaining the night vision device switched on when under the influence of a sufficient magnetic field, and effecting shutdown of the night vision device when the switch is no longer under the influence of the sufficient magnetic field.

3. The flip-up helmet mount according to claim 1 wherein the one-handed position adjustment assembly comprises a shaft rotationally received within a transverse bore of the helmet block, and a spring-biased ball and detent system located within the helmet block, the spring-biased ball and detent system including a plurality of springs and a plurality of balls, wherein the plurality of balls are biased by the plurality of springs toward the shaft.

4. The flip-up helmet mount according to claim 3 wherein the spring-biased ball and detent system further includes a use detent and a stowed detent on the shaft, the detents extending transversely along a length of the shaft, and wherein the plurality of balls are biased into the use detent when the night vision device is in the use position and the plurality of balls are biased into the stowed detent when the night vision device is in the stowed position.

5. The flip-up helmet mount according to claim 4 wherein the wherein the plurality of springs is three springs and the plurality of balls is three balls.

6. The flip-up helmet mount according to claim 1 wherein the one-handed tilt angle adjustment assembly comprises a cam system, the cam system including a cam knob, and wherein rotation of the cam knob produces rotation of the chassis relative to the bracket member.

7. The flip-up helmet mount according to claim 6 wherein the cam system further comprises a friction washer on a back side of a cam to prevent the chassis from slipping during normal operating conditions.

8. The flip-up helmet mount according to claim 1 wherein the night vision device is slidably received on a pair of racks of the chassis and the focal adjustment assembly includes a release lever that is biased by a return spring to engage one of a plurality of notches on one of the racks to retain the night vision device in a selected location relative to the chassis.

9. The flip-up helmet mount according to claim 8 wherein the release lever is hingedly connected to the chassis so that application of a substantially downward force on the release lever disengages the release lever from the one of a plurality of notches, permitting adjustment of the location the night vision device relative to the chassis.

10. The flip-up helmet mount according to claim 2 wherein the automatic shutdown assembly comprises a magnet module adjacent the magnetically-responsive switch, the magnet module having a cavity with a substantially oval-shaped profile, the cavity including a use end adjacent the magnetically-responsive switch and a stowed end opposite the magnetically-responsive switch, and a bar magnet slidably received within the cavity, and wherein, as the night vision device is rotated between the use position and the stowed position, the magnet moves between the use end of the cavity, where the magnet provides the sufficient magnetic field required to keep the night vision device on, and the stowed end of the cavity, where the magnet does not provide the sufficient magnetic field to the switch.

11. The flip-up helmet mount according to claim 10 wherein the bar magnet has a cylindrical shape with a length to diameter ratio of about 1:4 to about 2:1.

12. The flip-up helmet mount according to claim 11 wherein the bar magnet has a length to diameter ratio of about 1:1.

13. A flip-up helmet mount for a night vision device, the flip-up helmet mount comprising:
    a helmet block for securing the flip-up helmet mount to a helmet;
    a chassis for receiving the night vision device;
    a bracket member, extending between the helmet block and the chassis for rotationally coupling the chassis to the helmet block;
    position adjustment means for adjusting the night vision device between a use position and a stowed position;
    tilt angle adjustment means for adjusting a tilt angle of the chassis relative to the bracket member;
    focal adjustment assembly for adjusting a location of the night vision device relative to the chassis; and
    automatic shutdown means for influencing a magnetically-responsive switching device on the night vision device, the magnetically-responsive switching device maintaining the night vision device switched on when under the influence of a sufficient magnetic field, and effecting shutdown of the night vision device when the switch is no longer under the influence of the sufficient magnetic field,
    wherein the position adjustment means, the tilt angle adjustment means, and the focal adjustment means are all designed to allow one-handed adjustment of the flip-up helmet mount.

14. A flip-up helmet mount for a night vision device, the flip-up helmet mount comprising:
    a helmet block for securing the flip-up helmet mount to a helmet;
    a chassis for slidably receiving the night vision device;
    a bracket member, extending between the helmet block and the chassis for rotationally coupling the chassis to the helmet block;
    a one-handed position adjustment assembly within the helmet block for adjusting the night vision device between a use position and a stowed position, the position adjustment assembly including a spring-biased ball and detent system, wherein a plurality of balls are biased by a plurality of springs toward a shaft in a transverse bore of the helmet block, and wherein the shaft includes a pair of transverse detents extending along a length of the shaft, the detents corresponding to the use position and the stowed position of the night vision device;

a one-handed tilt angle adjustment assembly for adjusting a tilt angle of the chassis relative to the bracket member, the tilt angle adjustment assembly including a cam system having a cam knob, wherein rotation of the cam knob produces rotation of the chassis;

a one-handed focal adjustment assembly for adjusting a location of the night vision device relative to the chassis, the focal adjustment assembly including a pivotal release lever biased by a return spring to engage one of a plurality of notches on a rack of the chassis, wherein application of a substantially downward force on the release lever disengages the release lever from the one of a plurality of notches to permit adjustment of the location of the night vision device relative to the chassis; and an automatic shutdown assembly for influencing a magnetically-responsive switching device on the night vision device, the magnetically-responsive switching device maintaining the night vision device switched on when under the influence of a sufficient magnetic field, and effecting shutdown of the night vision device when the switch is no longer under the influence of the sufficient magnetic field, wherein the automatic shutdown assembly comprises a magnet module adjacent the magnetically-responsive switch, the magnet module having a cavity with a substantially oval-shaped profile, the cavity including a use end adjacent the magnetically-responsive switch and a stowed end opposite the magnetically-responsive switch, and a bar magnet slidably received within the cavity, and wherein, as the night vision device is rotated between the use position and the stowed position, the magnet moves between the use end of the cavity, where the magnet provides the sufficient magnetic field required to keep the night vision device on, and the stowed end of the cavity, where the magnet does not provide the sufficient magnetic field to the switch.

15. The flip-up helmet mount according to claim 14 wherein the plurality of springs is three springs and the plurality of balls is three balls.

16. The flip-up helmet mount according to claim 14 wherein the bar magnet has a cylindrical shape with a length to diameter ratio of about 1:4 to about 2:1.

17. A position adjustment assembly adapted for use in a flip-up helmet mount for a night vision device, the position adjustment assembly comprising:

a helmet block having a transverse bore therein;

a shaft rotationally received within the transverse bore of the helmet block; and a spring-biased ball and detent system located within the helmet block, the spring-biased ball and detent system including a plurality of balls biased against the shaft by a plurality of springs, wherein the position adjustment assembly is designed to allow one-handed adjustment of the position of the night vision device.

18. The position adjustment assembly according to claim 17 wherein the spring-biased ball and detent system further includes a use detent and a stowed detent on the shaft, the detents extending transversely along a length of the shaft, and wherein the plurality of balls are biased into the use detent when the night vision device is in a use position, and the plurality of balls are biased into the stowed detent when the night vision device is in a stowed position.

19. The position adjustment assembly according to claim 18 wherein the plurality of springs is three springs and the plurality of balls is three balls.

20. A tilt angle adjustment assembly adapted for use in a flip-up helmet mount for a night vision device, the tilt angle adjustment assembly comprising:

a cam system, the cam system including a cam knob, wherein rotation of the cam knob produces rotation of the night vision device relative to a user's eyes, and wherein the tilt angle adjustment assembly is designed to allow one-handed adjustment of the tilt angle of the night vision device.

21. A focal adjustment assembly adapted for use in a flip-up helmet mount for a night vision device, the focal adjustment assembly comprising:

a chassis including a pair of racks adapted to slidably receive the night vision device; and a single release lever that is biased by a return spring to engage one of a plurality of notches on one of the racks to retain the night vision device in a selected location relative to the chassis, wherein the focal adjustment assembly is designed to allow one-handed adjustment of the location of the night vision device.

22. The focal adjustment assembly according to claim 21 wherein the release lever is hingedly connected to the chassis so that application of a substantially downward force on the release lever disengages the release lever from the one of a plurality of notches, permitting adjustment of the location of the night vision device relative to the chassis.

23. An automatic shutdown assembly adapted for use in a flip-up helmet mount for a night vision device, the automatic shutdown assembly comprising:

a magnet module adapted to influence an adjacent magnetically responsive switching device on the night vision device, the magnet module having vertically extending cavity with a substantially oval-shaped profile, the cavity including a use end adjacent the magnetically-responsive switch and a stowed end opposite the magnetically-responsive switch, and a bar magnet slidably received within the cavity, wherein as the night vision device is rotated between a use position and a stowed position, the magnet moves between the use end of the cavity, where the magnet provides a magnetic field sufficient to keep the night vision device on, and the stowed end of the cavity, where the magnet does not provide the magnetic field sufficient to keep the night vision device on.

24. The automatic shutdown assembly according to claim 23 wherein the bar magnet has a cylindrical shape with a length to diameter ratio of about 1:4 to about 2:1.

25. The flip-up helmet mount according to claim 23 wherein the bar magnet has a length to diameter ratio of about 1:1.

* * * * *